Patented Aug. 26, 1924.

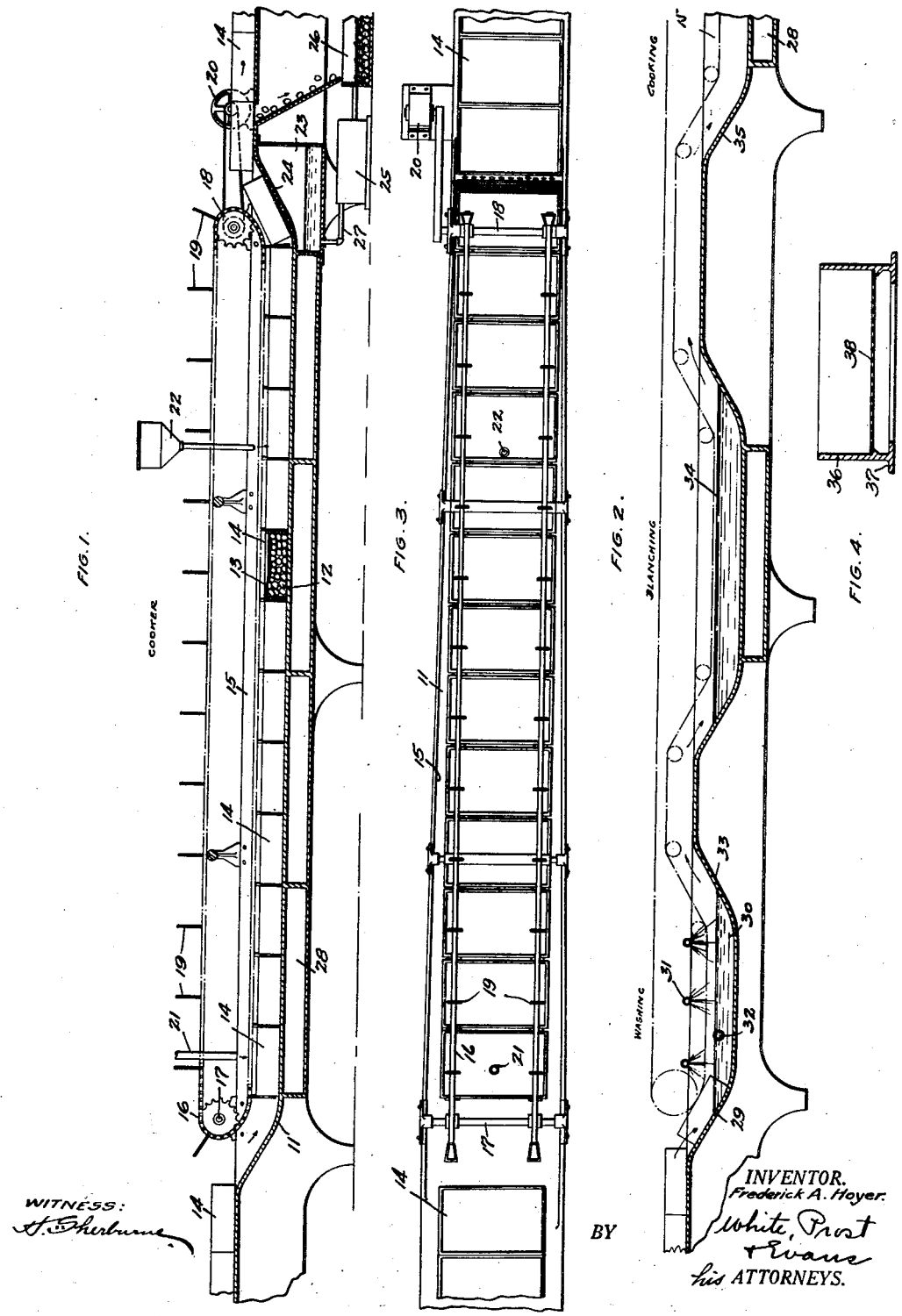

1,506,528

UNITED STATES PATENT OFFICE.

FREDERICK A. HOYER, OF REEDLEY, CALIFORNIA.

PROCESS AND APPARATUS FOR TREATING FOODS.

Application filed November 25, 1922. Serial No. 603,293.

*To all whom it may concern:*

Be it known that I, FREDERICK A. HOYER, a citizen of the United States, and a resident of the city of Reedley, in the county of Fresno, in the State of California, have invented a new and useful Process and Apparatus for Treating Foods, of which the following is a specification.

This invention relates to the art of preserving or conserving various articles of food, such as fruits of various kinds, and more particularly to a scheme for permitting the food to be cooked or otherwise treated while submerged in a syrupy liquid which gradually becomes thicker as the cooking continues.

In prior schemes of this character it is necessary to boil the syrup and fruit in a kettle until the necessary consistency is obtained, discharge the kettle, and finally recharge it with a new batch. This process is extremely wasteful of time, since the period consumed in actual cooking from the beginning of one charge to that of the next is about one-half of the total time consumed. It is one of the objects of my invention to make it possible to cook the material substantially continuously and to arrange matters in such a way that comparatively small loads of fruit and its associated syrup are progressively cooked, each small load forming an integral portion of the entire batch, and progressing through the cooking compartment as a substantially distinct unit.

In order to perform this process, I make use of the novel form of apparatus especially adapted for it. It is thus another object of my invention to provide a continuous cooker adapted to cook small batches of fruit in a continuous manner.

In such an apparatus it is convenient to provide a long trough-like container, which is heated in any appropriate manner, and through which the fruit passes. The travel of the fruit is accomplished by the aid of appropriate mechanism. Another object of my invention is to make it possible to regulate the conditions in such a device, such for example as the rate and period of cooking.

My invention possesses other advantageous features, some of which with the foregoing will be set forth at length in the following description, where I shall outline in full those forms of the invention that I have selected for illustration in the drawings accompanying and forming part of the present specification. Although in the drawings I have shown only a few forms of my invention, it is to be understood that I do not desire to be limited thereto, since the invention as expressed in the claims may be embodied in other forms also.

Referring to the drawings:

Figure 1 is a longitudinal section view, mainly diagrammatic, illustrating one form of the apparatus of my invention;

Fig. 2 is a view similar to Fig. 1 of a modified form of my invention;

Fig. 3 is a partial top plan view of the apparatus shown in Fig. 1; and

Fig 4 is an enlarged sectional view of one form of container that may be used for the food, for moving it through the forms of apparatus shown in the preceding figures.

In the embodiment shown in Fig. 1 there is a trough or other container 11, made of any appropriate material such as copper or glass lined iron, or steel. This trough is relatively long and narrow, and it serves as a guide for the conveyance of fruit or other food 12 which is covered with syrup 13, past a series of heating compartments 28 placed preferably beneath the trough. These compartments are separately controllable so far as the degree of heat of each is concerned, and any appropriate medium such as steam may be used for supplying the heat. In this way the fruit may be heated to the proper degree at each point of its travel through the trough 11.

In order to insure that the fruit 12 and the syrup 13 surrounding it progress through the trough 11, without mingling with fruit or food not in the same stage of cooking, I make use of movable compartments or containers 14 which comprise four-walled structures with open tops and bottoms. These compartments or containers 14 rest snugly upon the trough bottom, so that there is no appreciable leakage from the syrup enclosed in each compartment. The viscosity of the syrup 13 in fact aids in preventing loss and in sealing the compartments against leakage. Each of the compartments is just wide enough to slide between the vertical walls 15 of the trough 11, as shown most clearly in Fig. 3.

A modified form of compartment is illustrated in Fig. 4. In this figure, the walls 36 of the compartment are provided with wide edges 37 at the bottom, where they rest upon the trough 11. In this way the syrup has a much better sealing action and over a wider surface. Furthermore, instead of permitting the fruit to rest upon the bottom of the trough, a removable perforated plate 38 may be provided near the bottom upon which the fruit may rest. In this way the danger of improper mechanical treatment of the fruit is still better obviated.

The trough 11 narrows toward the delivery end, so that should any syrup escape from the compartments 14, it would find its way toward the receiving end.

As the loaded or charged compartments 14 move through the trough, say from left to right, the cooking is accomplished uniformly and continuously. This may be insured by proper regulation of the heating compartments 28 and of the rate at which the compartments 14 are moved through the trough 11. This rate I have found should be such as to make the process complete in about an hour, although of course the particular food treated has some effect on the proper period. A much more uniform product is obtained by this process than could be hoped for in the older method of cooking in kettles. Furthermore, since there is only a relatively small quantity of fruit in each compartment, distributed to a relatively shallow depth, there is no likelihood of seriously injuring the fruit by crushing or pressing.

Although I have described the process in connection with fruit that is cooked in syrup in comparatively large pieces, it is evident that many of the advantages apply also to the use of the process for making such preserves as jellies, jams, or marmalades.

The trough 11 at the receiving end rises so that containers 14 may be placed conveniently therein. These containers may be manually moved through the trough, but in order to secure maximum uniformity of the product, I prefer to utilize a mechanical drive for performing this function. In the present instance I have shown an endless chain 16 passing over two pulleys or wheels 17 and 18. The lower reach of this chain approaches the bottom of the trough 11. Evenly spaced on this chain are a series of push rods 19 each of which is adapted to engage the side of one of the compartments 14 and push it through the trough as the chain 16 moves. The spacing of the rods 19 is such that a container 14 may have just enough room to go between adjacent rods. For moving the chain a variable speed driving motor 20 may be utilized, connected to drive either one or the other of wheels 17 or 18. In this way the progress of the fruit or other food through the trough is made uniform, and its rate may readily be adjusted to produce the best effects. A comparatively slow movement of the chain is of course the usual requirement, but of course the particular value for best results will depend not only upon the kind of material which is being cooked but also upon the amount of heat produced by the compartments 28. These compartments, being located at the bottom only of the trough 11, cannot cause scorching of the syrup on the side of the traveling compartments 14. The heat distribution is substantially uniform since the layer of syrup 13 is comparatively shallow and of even depth at every point.

The introduction of the syrup 13 into the traveling compartments 14 may occur at any appropriate point. Thus a syrup pipe 21 may be provided near the receiving end, for this purpose. If considered desirable, the syrup may be preheated before introduction into the trough 11. Furthermore other ingredients such as sugar may be added at one or more convenient points of travel of the fruit, as for example by means of a feed trough 22.

At the delivery end of the trough there is preferably a space 23 connecting with the inclined end of the trough 11 by apertures 24, whereby the syrup 13 is drained from the moving compartments 14. This drained syrup is then conducted, as by pipe 27, to a filter 25 whence it passes in a clear state to the receiving pan 26. This pan also serves to receive the fruit 12 after it is delivered from the trough.

The complete process of cooking may now be described. The fruit in a bottomless or perforated compartment or container 14 is introduced into trough 11 at the sloping left hand end. The moving chain 16 and rods 19 serve to push the compartments forward in the trough. As the compartment passes under the pipe 21, it is filled nearly to the top thereof with syrup from the pipe. In passing other hoppers such as 22, other ingredients are added. In progressing through the trough 11 the fruit is cooked at the proper rate by the action of heat applied by compartments 28. At the delivery end of the trough the compartment 14 rises upon the sloping end of the trough and discharges the syrup through apertures 24. The fruit is then taken out of the compartments and discharged into the receiving tank 26, which is also in communication with the syrup filter 25. After the container 14 is emptied, it may be returned to the receiving end by the aid of the upper reach of chain 16, or by any other conveying means.

It is sometimes advantageous to treat the fruit in an appropriate manner before it is fed to the main heating trough 11. For example it may be advisable to wash the fruit or to blanch it, or both. In the embodiment shown diagrammatically in Fig. 2, provisions for both washing and blanching are shown. Thus the fruit is introduced in the containers 14 upon the sloping end 29 of the washing trough 30. Washing liquid is shown as supplied from pipes 31 and the trough may have an overflow pipe 32. As the container 14 rides over the sloping delivery end 33, the liquid is drained off in any appropriate manner. The container 14 next enters a heated trough 34 in which there is a blanching solution such as a hot brine. From this trough the container 14 finally enters the cooking trough 35 which is entirely similar in its mode of operation to that already described in connection with Fig. 1.

I claim:

1. The process of treating food such as fruit and the like, which consists in placing segregated portions of the food and its surrounding liquid directly upon a heated surface, and moving these portions over the heated surface.

2. The process of treating food such as fruit and the like, which consists in heating a relatively long surface, regulating the heat of portions of the surface and passing the food over the surface.

3. The process of treating food such as fruit and the like, which consists in heating a relatively long surface, regulating the heat of portions of the surface, segregating portions of the food and some liquid, and passing these portions at a regulated rate successively over the heated surface.

4. A container, means for heating a surface of the container, a compartment having an apertured bottom for segregating material to be treated, and means for sliding the compartment on the surface of the heated container.

5. A trough-like container, means for heating the bottom of the container, a compartment having an apertured bottom for segregating material to be treated, and means for sliding the compartment through the trough on the heated surface.

6. A container, means for variably heating portions of a surface of the container, a compartment having an apertured bottom for segregating material to be treated, and means for sliding the compartment on the heated surface of the container.

7. A container, means for heating a surface of the container, a plurality of box-like compartments for segregating material to be treated, said compartments being placed in succession next the heated surface, and having that portion open which is nearest the surface, and means for moving the compartments over the surface.

8. A trough-like heated container, a plurality of bottomless compartments in the container and forming with a surface of the container substantially tight spaces for the accommodation of material to be treated, and means for sliding the compartments through the container.

9. A trough-like heated container having upwardly sloping ends for receiving and discharging material, a plurality of compartments having apertured bottoms adapted to be placed in the trough at one end, said compartments forming with the bottom of the trough substantially tight spaces for segregating material to be treated, and means for sliding the compartments through the container.

10. A trough-like heated container for treating food such as fruit and the like, said container having an upwardly sloping discharge end, and a compartment having an apertured bottom for segregating a portion of the fruit and its associated liquid in the container and slidable upon the bottom surface thereof, the sloping discharge end of the container being provided with apertures to drain the liquid from the compartment as it moves to the discharge end.

11. The process of treating fruit which comprises moving a segregated charge of fruit and syrup through a heated trough containing syrup and with which the segregated charge is in communication and discharging the segregated charge of fruit and syrup from the trough.

12. The process of treating fruit which comprises moving a series of segregated charges of fruit through a trough containing heated syrup in such manner that some of the syrup is divided into segregated charges associated with the respective fruit charges and moves with the fruit charges through the trough.

13. The process of treating fruit which comprises moving a series of segregated charges of fruit through a trough containing syrup in such manner that some of the syrup is divided into segregated charges associated with the respective fruit charges and moves with the fruit charges through the trough, and applying heat to the syrup charges as they progress through the trough in order to thicken them.

14. A device for treating foods comprising a walled container for the food, having an apertured bottom and a member over which the container is adapted to slide, the walls of the container being widened at the bottom where they rest on the member.

15. A device for treating foods comprising a trough-like member adapted to contain syrup, and a container for the food having an apertured bottom and adapted to rest upon and be moved over the trough surface, said container having walls with widened portions where they rest upon the trough, whereby the syrup may effectually seal the bottom of the compartment.

In testimony whereof, I have hereunto set my hand.

FREDERICK A. HOYER.